United States
Nakamura

[11] 3,992,084
[45] Nov. 16, 1976

[54] ZOOM LENS SYSTEM ALSO CAPABLE OF ULTRA-CLOSEUP PHOTOGRAPHY

[75] Inventor: Soichi Nakamura, Kamakura, Japan

[73] Assignee: Nippon Kogaku K.K., Tokyo, Japan

[22] Filed: May 6, 1974

[21] Appl. No.: 467,582

[30] Foreign Application Priority Data
May 11, 1973 Japan................................ 48-51577

[52] U.S. Cl. ............................................... 350/186
[51] Int. Cl.$^2$ ......................................... G02B 15/18
[58] Field of Search..................... 350/186, 187, 184

[56] References Cited
UNITED STATES PATENTS

| | | | |
|---|---|---|---|
| 3,731,987 | 5/1973 | Iida.................................... | 350/187 |
| 3,773,402 | 11/1973 | Gela et al. .......................... | 350/184 |
| 3,784,285 | 1/1974 | Watanabe et al............... | 350/186 X |

Primary Examiner—Paul A. Sacher
Attorney, Agent, or Firm—Shapiro and Shapiro

[57] ABSTRACT

A zoom lens system which is also capable of ultra-closeup photography comprises in succession, as viewed from the object side of the lens system, a focusing lens group of positive power, a variator lens group of negative power, a compensator lens group of positive power and a master lens group of positive power, the variator and compensator lens groups being movable to provide the zooming action. When the lens groups are positioned to provide the minimum zooming focal length configuration of the lens system, the compensator lens groups may be moved toward the master lens group through a distance equal to the maximum amount of its movement during the zooming operation to form a lens system for use in ultra-closeup photography, wherein the focusing, variator and compensator lens groups together form a composite lens group having a focal length equal to or less than the focal length of the master lens group. The focal point of this composite lens group, as viewed from the image side of the lens system, lies on the side of the focusing lens group which faces away from the variator lens group. Alternatively, when the lens groups are positioned to provide the maximum zooming focal length configuration, the variator lens group may be moved toward the focusing lens group through a distance equal to the maximum amount of its movement during zooming operation to form the above-described lens system for ultra-closeup photography.

5 Claims, 4 Drawing Figures

ZOOM LENS SYSTEM ALSO CAPABLE OF ULTRA-CLOSEUP PHOTOGRAPHY

BACKGROUND OF THE INVENTION

1. Field of the Invention

This invention relates to a zoom lens system capable of ultra-closeup photography and which may be used with a still camera or the like.

2. Description of the Prior Art

In zoom lenses known by the tradename MACROZOOM, a portion of the magnification-changing section or of the master lens is movable independently of the zooming operation for permitting the lens system to focus an object located very close to the camera. In all these MACROZOOM lenses, the imaging magnification is at best ¼ times. When these lenses are employed with 8mm movie cameras, the filmed images are viewed during projection in which they are enlarged 200 times or more so that imaging magnification of ¼ times is acceptable to provide a sufficient projection effect. In the case of still cameras, however, the filmed images are not enlarged to this degree. Thus the need for increased imaging magnification is greater than the need for the ultra-closeup effect. As a result, fixed-focus lenses have been provided for enabling the imaging magnification to be increased up to the equimultiple level. However, these zoom lenses, which have been announced for use with still cameras and which are capable of both the zooming effect and ultra-closeup photography, have also been intended for use with 8mm movie cameras so that the imaging magnification of these zoom lenses has been at best ¼ to ⅓ times, which is far inferior to the imaging magnification of lenses having a single focal length. Furthermore, these zoom lenses have disadvantages, such as the complicated and enlarged interior configuration of the lens system and the resulting increase in the weight of the lens system when the imaging magnification of these zoom lenses is increased up to an equimultiple level by the original lens systems of 8mm movie cameras.

SUMMARY OF THE INVENTION

It is an object of the present invention to provide a zoom lens system for a still camera or the like which overcomes the above-noted disadvantages, which can provide imaging magnification up to the equimultiple level for enabling picture-taking to be effected at magnifications up to the equimultiple level, and which can provide imaging magnification comparable to that of single focal length lenses.

A photographic lens system in accordance with the present invention which is capable of ultra-closeup photography has a zoom lens system comprising, as viewed from the object side, a focusing lens group of positive power, a variator lens group of negative power, a compensator lens group of positive power and a master lens group of positive power. When the lens groups are positioned to provide the minimum zooming focal length configuration of the lens system, the compensator lens group may be moved toward the image side of the lens system through a distance equal to the amount of its movement during zooming operation to form an ultra-closeup lens configuration in which the focusing, variator and compensator lens groups together form a composite lens group having a focal length equal to or less than the focal length of the master lens group, the focal point of the composite lens group, as viewed from the image side of the lens system, lying on the side of the focusing lens groups which faces away from the variator lens group.

In accordance with another aspect of the present invention, when the lens groups are positioned to provide the maximum zooming focal length configuration of the lens system, the variator lens group may be moved toward the focusing lens group through a distance equal to the maximum amount of its movement during the zooming operation to provide the ultra-closeup configuration.

The above-described objects and advantages of the invention, as well as other objects and advantages, will be apparent from the following detailed description of the invention.

BRIEF DESCRIPTION OF THE DRAWINGS

The invention will be further described in conjunction with the accompanying drawings, which illustrate a preferred and exemplary embodiment, and wherein:

FIG. 1 showing the lens groups positioned to provide a long-focus lens system; FIG. 2, a medium-focus lens system; FIG. 3, a short-focus lens system; and FIG. 4, an ultra-closeup lens system.

DESCRIPTION OF THE PREFERRED EMBODIMENT

Figure 1:
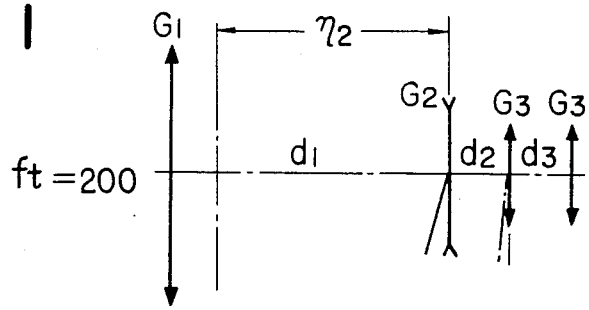
FIGS. 1–4 illustrate the construction of the Gauss area of a lens system in accordance with the present invention.

FIG. 1 illustrates the basic construction of the Gauss area of a zoom lens system according to the present invention. The lens system comprises in succesion, as viewed from the object side of the lens system, a focusing lens group G1 of positive power (the power of a lens group being the inverse of its focal length), a variator lens group G2 of negative power, and a compensator lens group G3 of positive power, these three lens groups forming an afocal composite lens system, and a fixed master lens group G4 of positive power disposed behind the afocal composite lens system.

Figure 2:
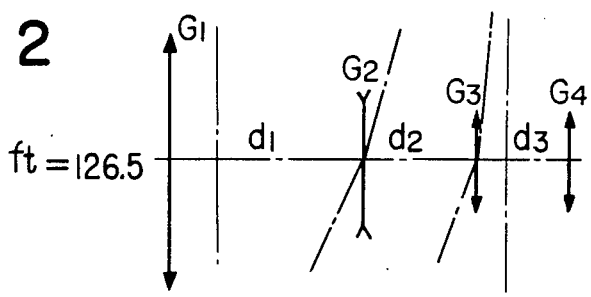
Figure 3:
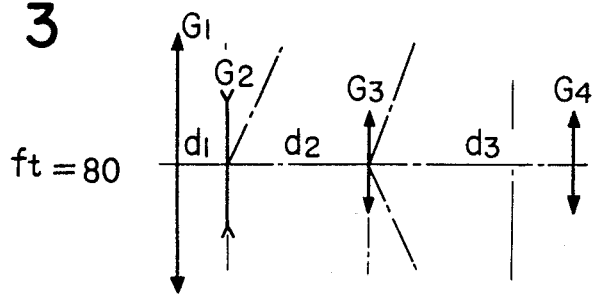

As the variator lens group G2 is moved from the position of FIG. 1 (which illustrates the relative positions of the lens groups for providing the maximum zooming focal length configuration of the lens system) through the position of FIG. 2 (the intermediate zooming focal length configuration) to the position of FIG. 3 (the minimum zooming focal length configuration), the power of the focusing lens group G1 provides a magnification-changing effect on the variator lens group G2. In the minimum zooming focal length configuration of FIG. 3 and in the ultra-closeup configuration, shown in FIG. 4, the focusing and variator lens group are positioned close enough to each other to be generally considered a single negative composite lens. Referring to FIGS. 1–4, the compensator lens group G3 is moved a distance $\eta_1$ toward the focusing lens group G1 (i.e., toward the objective side of the lens system) when the lens system is changed from the maximum zooming focal length configuration of FIG. 1 to the minimum zooming focal length configuration of FIG. 3. Similarly, variator lens group G2 is moved a distance $\eta_2$ in the same direction when the lens system is changed from the maximum to the minimum zooming focal length configuration.

To enable the lens system to be utilized for ultra-closeup photography, the compensator lens group G3 is moved rearwardly from the position of FIG. 3 toward the master lens group G4 (i.e., toward the image side of the lens system) for varying the position of the image point of the above-mentioned negative composite lens (formed by the focusing and variator lens groups) to thereby allow the object position, which is conjugate to the image point, to be shifted toward the lens system. Obviously, equimultiple magnification (i.e., a magnification of plus or minus 1 times) cannot be realized by the negative composite lens alone; therefore, the magnification provided by the compensator lens group G3 and master lens group G4 must be increased in order to increase the imaging magnification of the lens system as a whole up to equimultiple magnification. To achieve this result, it is assumed for the moment that the compensator lens group G3 is moved rearwardly by the amount $\eta_1$ to the position of FIG. 4, $\eta_1$ being the total amount of movement of the compensator lens group during the zooming operation illustrated by FIGS. 1–3. When the compensator lens group G3 is in the position of FIG. 4, the image point formed by the compensator lens group G3 must be at infinity ($\infty$) so that the final master lens group G4 can focus the image point on the surface of the film.

The focal lengths of the focusing lens group G1, the variator lens group G2, the compensator lens group G3 and the master lens group G4 are $f_1, f_2, f_3$, and $f_4$, respectively, and the distances between the focusing lens group G1 and the variator lens group G2, between the variator lens group G2 and the compensator lens group G3, and between the lens group G3 and the master lens group G4, are $d_1, d_2$ and $d_3$, respectively. If we let $f_V$ be the focal length of the composite lens system formed by the lens groups G1, G2 and G3, then the magnification $\beta$ of the image formed by this lens system is $$\beta = \frac{-f_4}{f_V}$$

Therefore, to realize the equimultiple or higher magnification the following relation must be satisfied:

$$\beta \leq -1, \text{ or } \frac{1}{f_V} \geq \frac{1}{f_4}.$$

Thus, for a positive value of $f_4$, $f_V$ must be positive and must be smaller in value than $f_4$.

Figure 4:
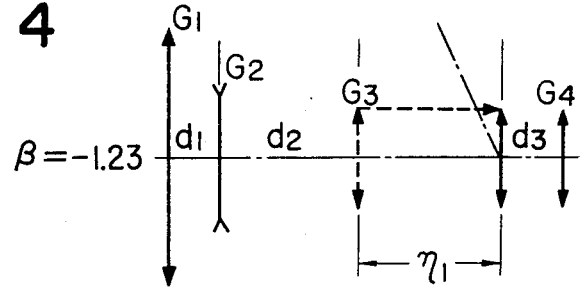

If we let $d_1'$ and $d_2'$ be the distance between the focusing lens group G1 and the variator lens group G2 and between the variator lens group G2 and the compensator lens group G3, respectively, for the minimum zooming focal length configuration of the lens system, shown in FIG. 3, the $d_1'$ and $(d_2 + \eta_1)$ are the distances between lens groups G1 and G2 and between lens groups G2 and G3, respectively, for the ultra-closeup configuration of FIG. 4. The focal length $f_V$ of the composite lens system for the ultra-closeup lens configuration of FIG. 4 can then be expressed as:

$$\frac{1}{f_V} = \frac{1}{f_1} + \frac{1}{f_2} + \frac{1}{f_3} - \frac{1}{f_1 f_3}(d_1' + d_2' + \eta_1) -$$

$$\frac{d_1'}{f_1 f_2} - \frac{d_2' + \eta_1}{f_2 f_3} + \frac{d_1'(d_2' + \eta_1)}{f_1 f_2 f_3}.$$

Hence, the following condition is established for equimultiple or higher magnification:

$$\frac{1}{f_1} + \frac{1}{f_2} + \frac{1}{f_3} - \frac{1}{f_1 f_3}(d_1' + d_2' + \eta_1) -$$

$$\frac{d_1'}{f_1 f_2} - \frac{d_2' + \eta_1}{f_2 f_3} + \frac{d_1'(d_2' + \eta_1)}{f_1 f_2 f_3} \geq \frac{1}{f_4} \quad (1)$$

However, even if equation (1) is satisfied, the construction of the lens system must not be such that the subject position comes into the zoom lens system. In other words, the object position must be one the side of focusing lens group G1 which faces away from variator lens group G2. As described hereinabove, lens group G1, G2 and G3 form an afocal composite lens system for forming an image point at infinity for an object, the lens group G4 cooperating with the composite lens system to form an image of the object in the plane of the camera film. Thus, if the position of the image point of the composite lens system is considered for an object point lying at an infinite distance on the image side of the composite lens system (i.e., the object is on the right side of the composite lens system as shown in FIGS. 1–4, so that the light from the object passes through the lens groups in the direction from the compensator lens G3 to the focusing lens group G1), then the distance from the image point to the focusing lens group G1 (i.e., the back-focus, hereinafter referred to as Bf) can be represented by the product of the emergence height at the focusing lens group G1 and the focal length $f_V$ of the composite lens system. Bf can therefore be expressed as:

$$Bf = \left\{ 1 - \frac{d_2' + \eta_1}{f_3} - d_1'\left(\frac{1}{f_3} + \frac{1}{f_2} - \frac{d_2' + \eta_1}{f_2 f_3}\right) \right\} f_V.$$

To prevent the object position from coming into the zoom lens system, there must be the relation that $Bf > 0$. As pointed out above, for enabling the lens system to provide equimultiple or higher imaging magnification, $f_V$ must have a positive value, so that for $Bf > 0$ the following condition must be satisfied:

$$1 - \frac{d_2' + \eta_1}{f_3} - d_1'\left(\frac{1}{f_3} + \frac{1}{f_2} - \frac{d_2' + \eta_1}{f_2 f_3}\right) > 0 \quad (2)$$

By designing the zoom lens system so as to satisfy conditions (1) and (2), there is provided a zoom lens system which enables ultra-closeup photography to be accomplished at equimultiple or even higher magnifications.

In the above description, the ultra-closeup configuration of the lens system, shown in FIG. 4, is formed by moving the compensator lens group G3 through a distance $\eta_1$ toward the image side of the lens system from the position shown in FIG. 3, which illustrates the relative positions of the lens groups for providing the minimum zooming focal length. However, it will be readily apparent that the ultra-closeup configuration can be formed by moving the variator lens group G2 from its position in the configuration of FIG. 1, which shows the relative positions of the lens groups for providing the maximum zooming focal length of the lens system, toward the object side of the lens system (i.e., toward focusing lens group G1) through a distance $\eta_2$ (see FIG. 1) equal to the total distance through which the variator lens group moves during the zooming operation.

The present invention will be described more in detail referring to an example of a zoom lens which is particularly well-suited for use with a 35mm still camera and has a zooming focal length range of 80–200mm and a brightness of F5.6, FIGS. 1–3 show the relative positions of the lens groups for providing zooming focal lengths $f_t$ of 200mm, 126.5mm, and 80mm, respectively. In this example, the imaging magnification $\beta$ of the zoom lens system for the ultra-closeup configuration of FIG. 4 is −1.23. All numerical values represent units of millimeters.

| Lens group | Focal length |
|---|---|
| G1 | $f_1 = 99.3328$ |
| G2 | $f_2 = -25.6442$ |
| G3 | $f_3 = 60.5901$ |
| G4 | $f_4 = 123.4495$ |

| Total focal length ($f_t$) | Intergroup distance | | |
|---|---|---|---|
| | $d_1$ | $d_2$ | $d_3$ |
| 200.0 | 47.7384 | 9.604 | 10.0000 |
| 126.5 | 32.6578 | 18.9188 | 15.7663 |
| 80.0 | 8.8133 | 24.8091 | 33.7200 |

| Total Magnification ($\beta$) | Intergroup distance | | | | |
|---|---|---|---|---|---|
| | $d_1$ | $d_2$ | $d_3$ | $\eta_1$ | $\eta_2$ |
| −1.230 | 8.8133 | 48.5291 | 10.0000 | 23.7200 | 38.9251 |

According to the above-described construction of the present invention, ultra-closeup photography is effected by maximum utilization of the space through which the lens groups are moved during the zooming operation to provide a compact lens system, thereby avoiding the complication and enlargement of the system which has been experienced with the zoom lens systems of the prior art. Although the present embodiment has been described with respect to a still camera, it will be apparent to those skilled in the art that the zoom lens system of the present invention may be used with other types of cameras.

It is believed that the advantages and improved results furnished by the zoom lens system of the invention will be apparent from the foregoing description of a preferred embodiment of the invention. Various changes and modifications may be made without departing from the spirit and scope of the invention as sought to be defined in the following claims.

I claim as my invention:

1. A photographic zoom lens system capable of ultra-closeup photography having an object side and an image side, the lens system comprising in succession, as viewed from the object side, a focusing lens group of positive power, a variator lens group of negative power, a compensator lens group of positive power and a master lens group of positive power, a portion of said zoom lens system being movable to provide minimum and maximum zooming focal length configurations of the lens system, at least one of said lens groups being movable independently of the zooming operation to a predetermined position to form an ultra close-up configuration wherein said focusing lens group, said variator lens group and said compensator lens group-together in said ultra close-up configuration form a composite lens group having a focal length substantially equal to or less than the focal length of said master lens group with the focal point of said composite lens group, as viewed from the image side of the lens system, lying on the side of the focusing lens group facing away from the variator lens group, wherein said one lens group comprises the compensator lens group, and wherein the compensator lens group is movable from its position in said minimum zooming focal length configuration of the lens system toward the image side of the lens system to reach said predetermined position.

2. A photographic lens system as set forth in claim 1, wherein the distance through which the compensator lens group is moved to reach said predetermined position is substantially equal to the distance between the positions of the compensator lens group in said minimum and maximum zooming focal length configurations, respectively, of the lens system.

3. A photographic lens system as set forth in claim 1, wherein $f_1, f_2, f_3$ and $f_4$ are the focal lengths of the focusing, variator, compensator, and master lens group, respectively; $d_1'$, $d_2'$ and $d_3'$ are the distances between the focusing the variator lens groups, between the variator and compensator lens groups, and between the compensator and master lens groups, respectively, for the minimum zooming focal length configuration of the lens system; and $\eta_1$ is the distance between the positions of the compensator lens group in the minimum and maximum zooming focal length configurations, respectively, of the lens system: and wherein the following two equations are satisfied after the compensator lens group has been moved from its position in said minimum zooming focal length configuration to said predetermined position:

$$\frac{1}{f_1} + \frac{1}{f_2} + \frac{1}{f_3} - \frac{1}{f_2 f_3}(d_1' + d_2' + \eta_1) - \frac{d_1'}{f_1 f_2} - \frac{d_2' + \eta_1}{f_2 f_3} + \frac{d_1'(d_2' + \eta_1)}{f_1 f_2 f_3} \geqq \frac{1}{f_4} \quad (1)$$

$$1 - \frac{d_2' + \eta_1}{f_3} - d_1' \left( \frac{1}{f_3} + \frac{1}{f_2} - \frac{d_2' + \eta_1}{f_2 f_3} \right) > 0 \quad (2)$$

4. A photographic lens system according to claim 3, wherein the focal lengths and distances referred to in claim 4 have substantially the following values:

| | |
|---|---|
| $f_1 = 99.3328$mm | $d_1' = 8.8133$mm |
| $f_2 = -25.6442$mm | $d_2' = 24.8091$mm |
| $f_3 = 60.5901$mm | $d_3' = 33.720$ mm |
| $f_4 = 123.4495$mm | $\eta_1 = 23.720$ mm |

5. A photographic zoom lens system capable of ultra-closeup photography having an object side and an image side, the lens system comprising in succession, as viewed from the object side, a focusing lens group of positive power a variator lens group of negative power, a compensator lens group of positive power and a master lens group of positive power, a portion of said zoom lens system being movable to provide minimum and maximum zooming focal length configurations of the lens system, at least one of said lens groups being movable independently of the zooming operation to a predetermined position to form an ultra close-up configuration wherein said focusing lens group, said variator lens group and said compensator lens group together in said ultra close-up configuration form a composite lens group having a focal length substantially equal to or less than the focal length of said master lens group with the focal point of said composite lens group, as viewed from the image side of the lens system, lying on the side of the focusing lens group facing away from the variator lens group, wherein said one lens group comprises the variator lens group, and wherein the variator lens group is movable from its position in said maximum zooming focal length configuration of the lens system toward the object side of the lens system to reach said predetermined position, wherein the distance through which the variator lens group is moved to reach said predetermined position is substantially equal to the total distance between the positions of said variator lens group is said minimum and maximum zooming focal length configurations, respectively, of the lens system, wherein $f_1, f_2, f_3$ and $f_4$ are the focal lengths of said focusing, variator, compensator, and master lens groups, respectively; $d_1'$, $d_2'$ and $d_3'$ are the distances between the focusing and variator lens groups, between the variator and compensator lens groups, and between the compensator and master lens groups, respectively, for said maximum zooming focal length configuration of the lens system; and $\eta_2$ is the distance between the positions of the variator lens group in said minimum and maximum zooming focal length configurations, respectively, of the lens system; and wherein the focal lengths and distances described above have substantially the following values:

| | |
|---|---|
| $f_1 = 99.3328$ mm | $d_1' = 47.7384$ mm |
| $f_2 = -25.6442$ mm | $d_2' = 9.604$ mm |
| $f_3 = 60.5901$ mm | $d_3' = 10.0000$ mm |
| $f_4 = 123.4495$ mm | $\eta_2 = 38.9251$ mm |

* * * * *